H. C. WHITE.
COMPENSATING PITMAN-CONNECTIONS, JOURNALS OR AXLES.
No. 188,453. Patented March 13, 1877.
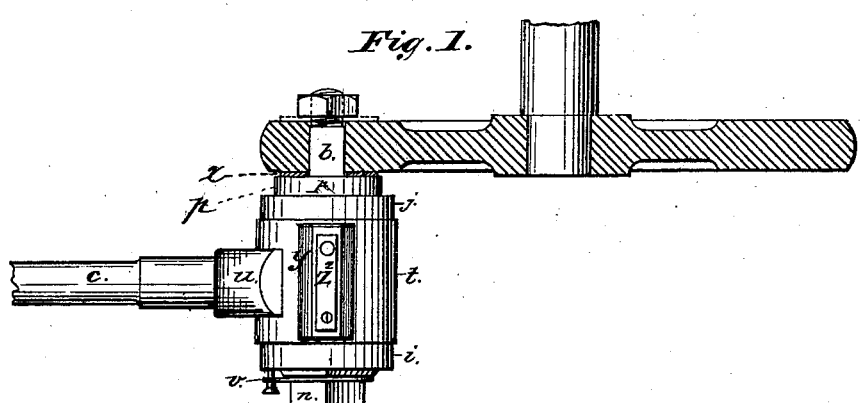
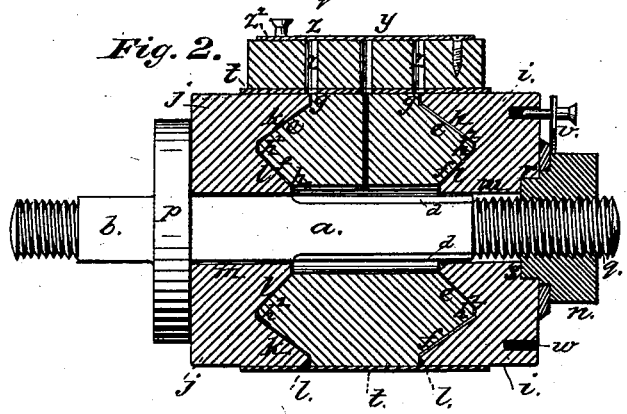
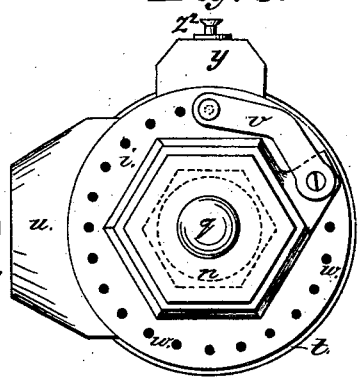
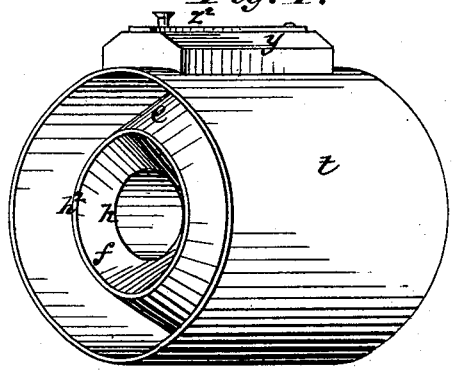
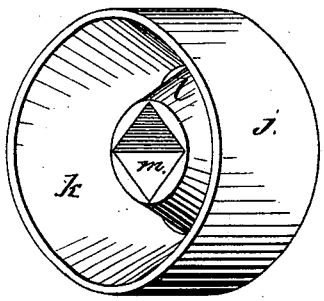
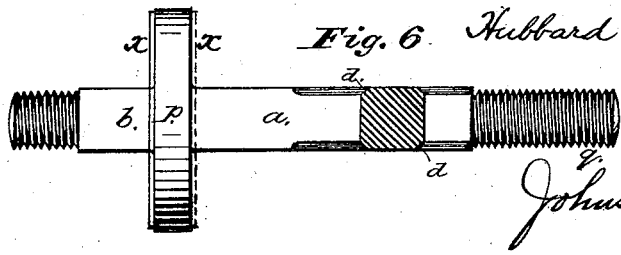
Witnesses:
Floyd Norris
D. P. Cowl
Inventor:
Hubbard Carr White
by Atty
Johnson & Johnson

UNITED STATES PATENT OFFICE.

HUBBARD C. WHITE, OF VERSAILLES, KENTUCKY.

IMPROVEMENT IN COMPENSATING PITMAN-CONNECTIONS, JOURNALS, OR AXLES.

Specification forming part of Letters Patent No. 188,453, dated March 13, 1877; application filed February 17, 1877.

*To all whom it may concern:*

Be it known that I, HUBBARD CARR WHITE, of Versailles, in the county of Woodford and State of Kentucky, have invented certain new and useful Improvements in Compensation Pitman-Connection, Journal, or Axle, which improvements are fully set forth in the following specification and accompanying drawings.

As a compensation pitman-connection, my invention is especially designed to prevent the jerking incident to the reverse motions of the cutters of reapers and mowers, and in the important particular of excluding dust from such connection. It is, however, adapted for journal or axle bearings in which it is important to compensate for the wear of the parts. Bearings with truncated cones and compensating conical and cup-shaped retainers in connection therewith have been employed in various ways in revolving and vibrating connections; but, so far as I know, my improved device is new as an entirety, as well as in the particulars of specific combinations, embracing a square-shank stud-bolt, with retainers or caps and a hub, both of peculiar construction, consisting of interior reverse truncated conical bearings, matching with each other at both ends of the hub, and in such manner that the focal end of each bearing-surface shall stand in opposite or reverse direction, and give a double bearing to each end of the hub and to each retainer or cap, so that I produce oblique bearing-surfaces, which preserve the same divergence from the axis under the compensating adjustment of the caps, which is a very important matter in maintaining the equalization of the bearings in taking up the wear, and prevent all tendency to stick or lock the pitman.

The retainers or caps are fitted upon the square shank of the bolt, and the hub turns upon said caps free of the bolt. A lock-nut is combined with the square bolt, the hub, and the retainers, the outer one of which has a concentric row of holes, into which a spring catch or detent of the nut is adjusted in compensating for the wear and locking the nut, as it is evident, with the construction stated, an ordinary nut would be useless. A band secured to or formed with the hub embraces the inner ends of the retainers, and, covering the bearing-joints snugly, serves to exclude the dust therefrom and form a secure attachment for the pitman or other part of the hub.

The lock-nut has an annular neck or collar on its inner face, and the cap or retainer has a corresponding recess to receive such collar, so that the outer retainer or cap, supported at its inner side by the reverse intermatching cones, is supported also upon the neck of the lock-nut, and is thereby balanced to keep the reverse bearings intact.

A lubricating-chamber is combined with the dust-band or hub in a manner to feed the oil at points coincident with the base of the outer truncated cones of the hub and the corresponding diverging bearing-surfaces of the retainers or cones, so as to effect a thorough lubrication of all the bearing-surfaces.

Referring to the drawings, Figure 1 represents a top view of my improved compensating device as applied to a pitman-wheel connection; Fig. 2, a vertical section, and Fig. 3 an end view, of the same. Fig. 4 is a view, in perspective, of the double reverse-coned hub; Fig. 5, one of the double reverse-coned retainers or caps, and Fig. 6 the stud-bolt answering to the wrist-pin of the pitman-wheel.

The square-bolt $a$, in the application of the device shown, is the pitman-wrist-pin connection with the pitman-wheel for driving the cutters of reapers and mowers, said bolt having a square shank, $b$, and screw-threaded end, to receive a nut by which to secure it to the wheel.

The box or hub to which the pitman-rod $c$ is connected is mounted upon the bolt $a$ by a central opening large enough to allow the hub to turn easily upon the bolt or without touching it during the rotations of the wheel, the angles of the shaft being slightly flattened at $d$ for that purpose. This box or hub is of peculiar construction, having its opposite ends formed in reverse truncated cones $e\,f$, the base $g$ of the outer one, $e$, terminating near the circumference of the hub, and the focal end $h$ of the inner one, $f$, terminating in the central opening of the hub, so that the focal end $h^2$ of the outer truncated cone $e$ forms a junction with the base of the reverse or inner truncated cone $f$. This box or hub is held in place upon the shaft by retainers or caps $i\ j$, having interior reverse truncated cones $k\ l$, corresponding exactly with those of the hub, so that the inward-projecting cone-bearings $l$ of the caps enter the inner cone-bearings $f$ of the hub, while the outer cap cone-bearings $k$ match with and upon the outer hub cone-bearings $e$, so that the surfaces subject to wear present acute angles of contact, one to the other, so that in the adjustment of the caps to take up the wear of these surfaces their angles of divergence remain always the same in relation to the axis of the bolt.

This construction, moreover, insures the steady position of the hub in its place, and prevents the possibility of the caps sticking the hub fast on the bolt, or to lock the pitman, while, at the same time, such construction keeps the wear of the parts equal.

These retainers or caps have square openings $m$, Fig. 5, corresponding with the form of the bolt which holds them from turning thereon. The compensating adjustment is made by the outer cap $i$, which being forced by a nut, $n$, against the hub, the latter, in turn, is kept against the inner cap $j$, which is supported against a head or shoulder, $p$, fixed on the bolt between the inner cap and the wheel or other part.

The outer end $q$ of the bolt is screw-threaded sufficient to take up the wear of the parts, and the outer cap $i$, while fitting the square portions of the bolt, extends partially over the threaded portion, and has no support upon such latter portion of the bolt; but such support is given by the nut $n$, by means of an annular neck or collar, $r$, Fig. 2, projecting from its inner side, and, entering an annular recess, $s$, in the outer face of the cap, sustains the outer portion of the cap $i$, and keeps its bearings intact.

To prevent dust and dirt from entering the bearing-surfaces at the caps and hub-joints, I provide the hub with a band, $t$, open at its ends, and, fitting snugly over and partially covering the caps or retainers, practically closes their junction with the hub, and preserves the lubricant and bearing-surfaces in good working condition.

This shield or dust-band serves also as the means of connecting the pitman $c$ by a socket, $u$, into which said pitman is made adjustable by a screw-joint.

The hub and its covering-band $t$ may be separate or cast in one piece, as may be deemed best.

In keeping the bearings of the caps and hub intact, it is necessary that the nut must be locked and provided with means for holding it in its adjustments. For this purpose the nut $n$ is provided with a spring pin or detent, $v$, arranged to enter any one of a series of holes, $w$, in the outer face of the outer cap $i$, so that as the nut is turned up to compensate for the wear, the detent $v$ enters a hole in the cap, which, being held from turning by the angular form of the bolt, locks the nut. The spring-detent may be secured in any suitable way, and the holes are formed close together in an annular row, to suit the take-up adjustments, without binding the caps too tight upon the hub. As the take-up is all from one end of the bolt, it would, in time, throw the pitman out of true and direct line of action; and to compensate for this I arrange, as may be required, washers $x$ between the pitman-wheel and the bolt-head or shoulder $b$, and between said bolt-head or shoulder $p$ and the inner cap $j$, so that the connections are kept in straight line. (See Figs. 1 and 6.)

An oil-supply, $y$, is arranged upon the dust-band or hub, with suitable cells, perforations, or chambers $z$ for the oil, and adapted to deliver the oil at the junction of the outer inter-matching cones, as shown in Fig. 2, from which points it spreads over the bearing-surfaces alike at both ends of the hub. A spring-cap, $z^2$, closes the oil-cells. The device can be made of metal, or partly of wood and partly metal.

In using wood for the hub and caps, the latter are bound with iron bands counter-sunk to prevent contact with the dust-band, and the outer cap would be faced with a plate, with the holes formed therein to receive the nut-detent.

I claim—

1. In a compensating pitman-connection, journal, or axle, the device of a double-reverse-coned hub, in combination with caps or retainers having corresponding and inter-matching double reverse-cone bearings and an angular connecting-bolt, substantially as and for the purpose herein set forth.

2. In a compensating device for revolving or vibrating connections, consisting of a double-reverse-coned hub, caps, or retainers, having corresponding and intermatching double reverse-cone bearings, and an angular connecting-bolt, the combination therewith of a nut adapted to lock with the outer cap, for co-operation in compensating for the wear, as herein set forth.

3. In a compensating device for revolving or vibrating connections, consisting of a double-reverse-coned hub, caps, or retainers, having corresponding and intermatching double reverse-cone bearings and an angular connecting-bolt, the combination therewith of a hub-covering band or rim, for protecting the bearing-surfaces from dust and dirt.

4. The combination, with the compensating pitman-connection constructed substantially as herein set forth, of the dust-band or bearing-shield and the pitman-rod, substantially as herein set forth.

5. The combination, with the compensating device, constructed substantially as herein set forth, of the oil-chamber, arranged to feed the supply at the junction of the outer truncated cone-bearings of the hub and caps, as described.

6. The combination, with the angular bolt $a$, the hub and the caps constructed and adapted for compensation, as set forth, and the nut locked by the outer cap, of the washers $x$ and the bolt-shoulder $p$, for the purpose set forth.

7. A compensating pitman-connection device, consisting of the angular-bolt $a$, the hub, and the take-up caps having like double-reverse diverging cones, working one within the other, a covering or shield-band, $t$, for the joints thereof, and a nut locked by and supporting the outer cap, all constructed and cooperating substantially in the manner and for the purpose herein set forth.

8. The combination, with the angular bolt $a$ and the outer cap or retainer $i$, having the recess $s$, of the lock-nut $n$, having the annular neck or collar $r$, to fit within said recess, to support the outer end of the cap and keep its bearings intact.

In testimony whereof I have hereunto set my hand in the presence of two witnesses.

HUBBARD CARR WHITE.

Witnesses:
   SHREWS D. HURST,
   DAVID L. THORNTON.